Nov. 9, 1926.　　　　　　　　　　　　　　　　　1,606,732
A. W. HAISS
INTERLOCKING MECHANISM FOR TRANSMISSIONS
Filed Sept. 28, 1925　　　3 Sheets-Sheet 1

INVENTOR
Alfred W. Haiss
BY
Williams & Morse
ATTORNEYS.

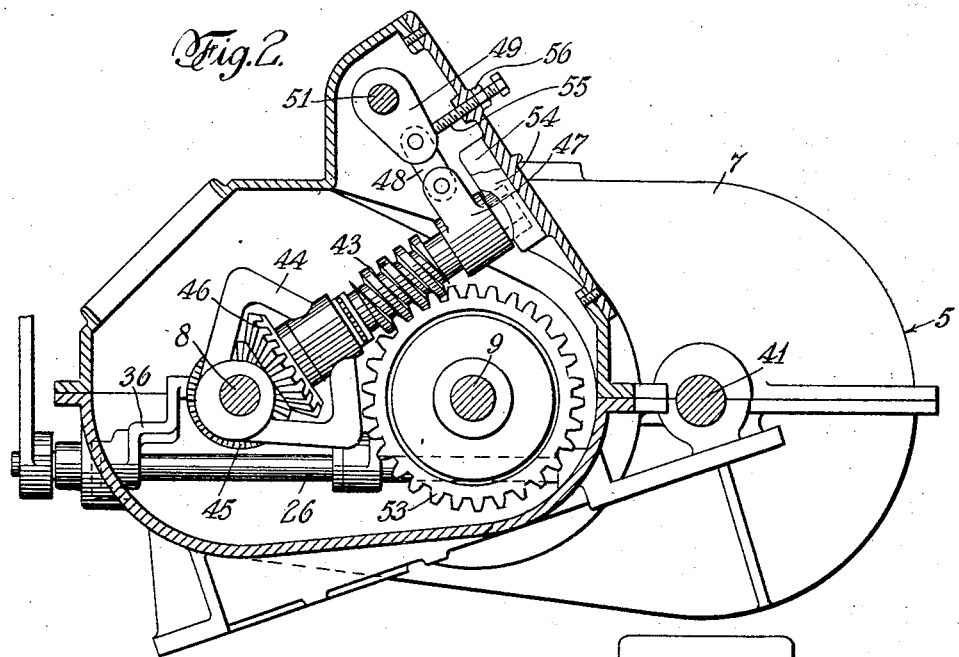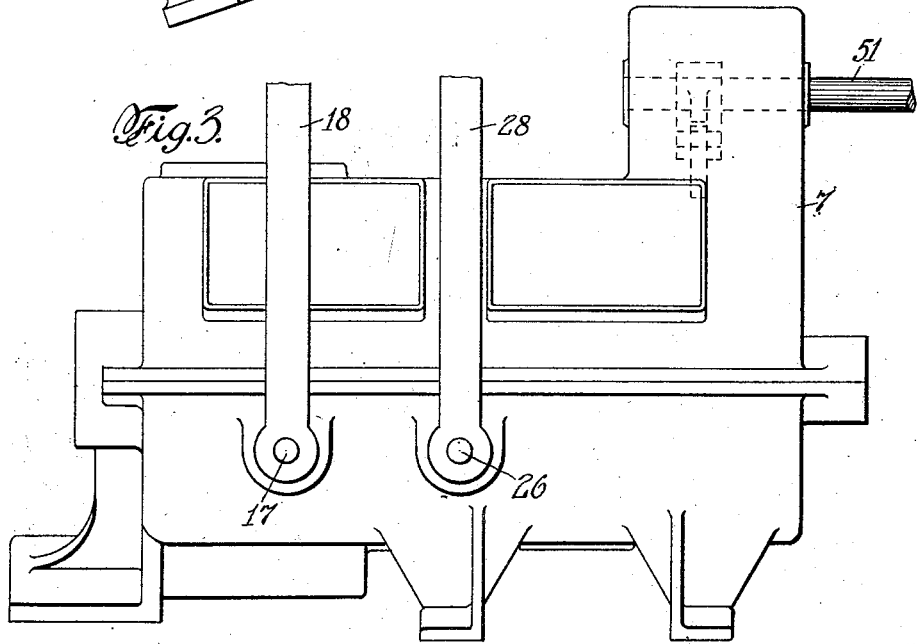

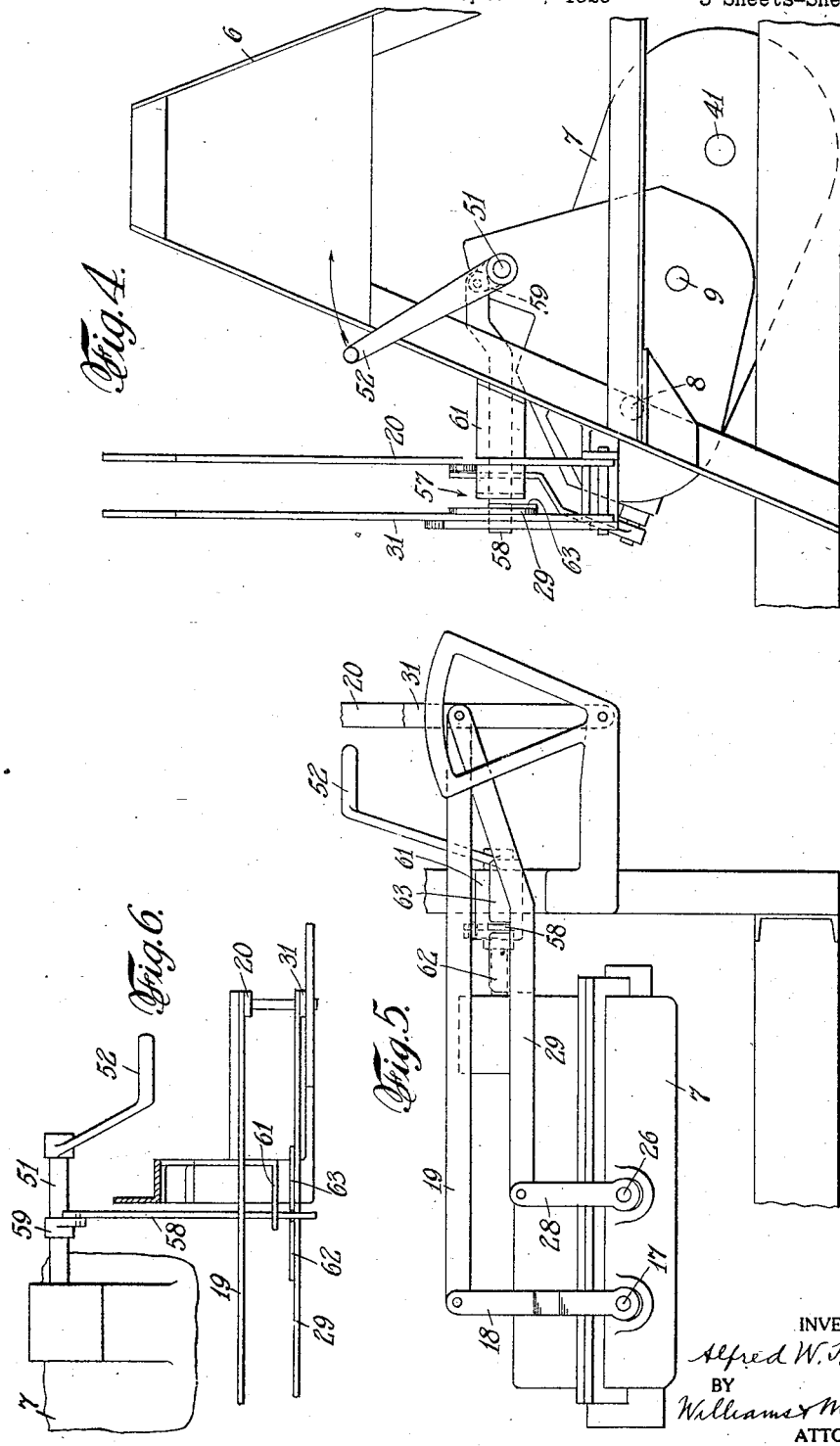

Patented Nov. 9, 1926.

1,606,732

UNITED STATES PATENT OFFICE.

ALFRED W. HAISS, OF NEW YORK, N. Y., ASSIGNOR TO GEORGE HAISS MANUFACTURING CO., INC., OF NEW YORK, N. Y., A CORPORATION OF NEW YORK.

INTERLOCKING MECHANISM FOR TRANSMISSIONS.

Application filed September 28, 1925. Serial No. 59,018.

This invention relates to interlocking mechanism for power transmissions and is herein described as being particularly adapted for use in wagon loaders of the power operated type exemplified in United States Patent No. 1,531,481, to George Haiss, dated March 31, 1925.

In wagon loaders of the type with which the transmission embodying my invention is particularly adapted for use, a power plant is so employed as to enable the same to be used as a means for propelling or transporting the loader from place to place, for operating the elevator or conveyor, for driving the rotatable digging elements located on the rear of the loader, and for effecting a creeping or crowding movement of the loader towards and into the pile of material to be loaded as the path of travel is cleared of the material by the digging elements and conveyor.

Heretofore, the usual forward and reverse speeds have been effected through a main transmission, while the slow crowding or creeping movement of the machine towards and into the pile of material has been effected through the instrumentality of an auxiliary transmission comprising a worm adapted to be driven through a train of sprockets and gears arranged outside of the main transmission housing and driven from the take-off sprocket of the power plant as shown in said patent.

An object of this invention is to provide a reliable safety means for rendering the main transmission inoperative so long as engagement is maintained between the driving and driven elements of the auxiliary transmission, and to render the auxiliary transmission inoperative so long as engagement is maintained between the driving and driven elements of the main transmission.

In the drawings Figure 1 is a view, partly in section and partly in plan, of a transmission.

Figure 2 is a transverse sectional view taken on line 2—2 of Figure 1.

Figure 3 is a view of the transmission as seen from the left in Figure 2.

Figure 4 is a fragmentary view in elevation showing the transmission mounted upon a wagon loader frame and having certain control levers associated therewith.

Figure 5 is a view in elevation of the transmission as seen from the left in Figure 4.

Figure 6 is a fragmental plan view of the transmission as viewed from above in Figure 5.

Figure 1:
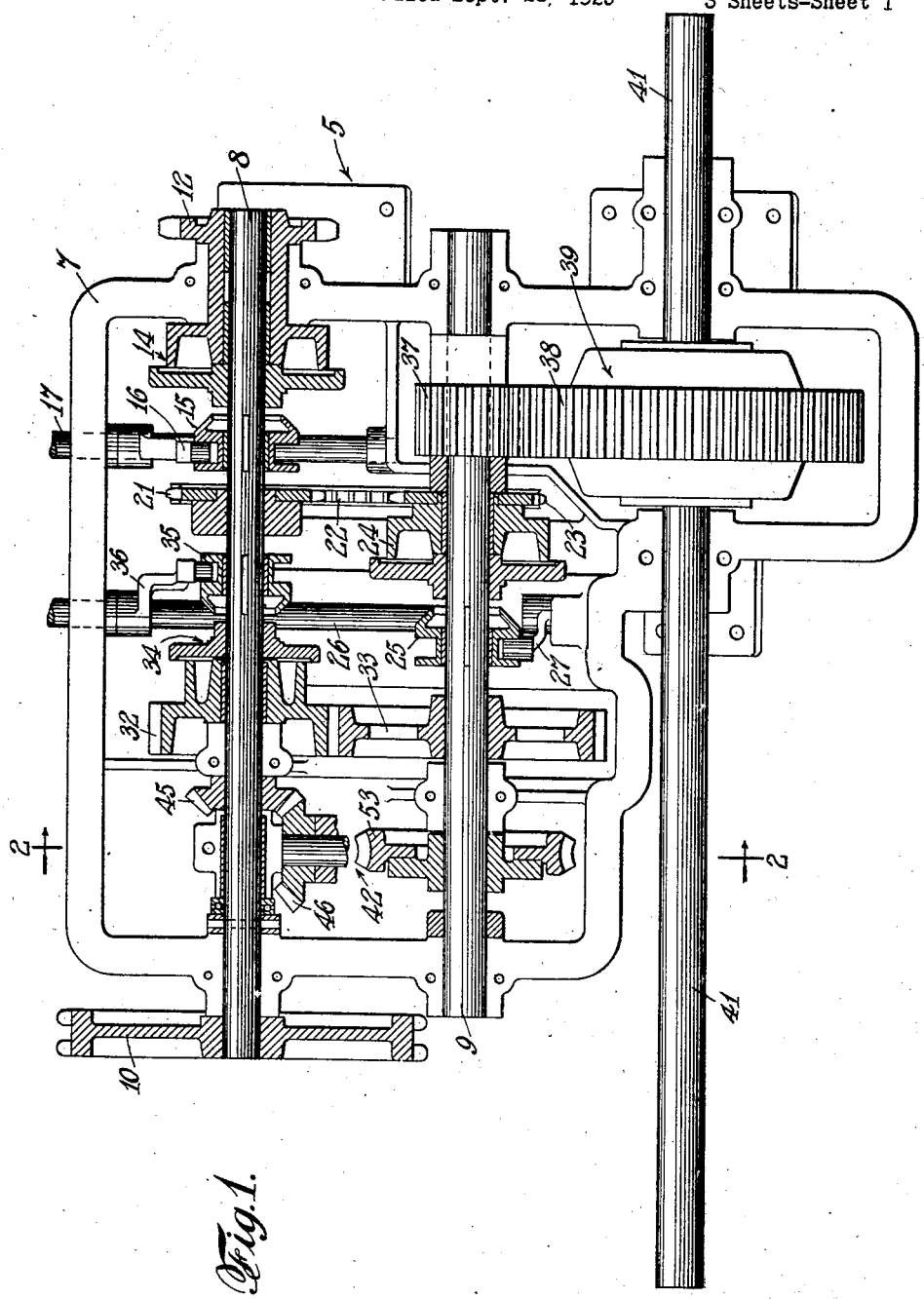

The transmission 5 is adapted to be suitably mounted upon a frame 6, when used in connection with a wagon loader, and is adapted for connection with a suitable source of power such as an internal combustion engine, not shown. Within the housing 7 of the transmission are journaled drive and driven shafts 8 and 9, respectively, the drive shaft 8 being provided at one end with a power sprocket 10 which is adapted for connection with a suitable source of power such as an internal combustion engine, not shown. Upon the opposite end of the drive shaft 8 is journaled a take-off sprocket 12 which is adapted for connection with suitable gearing employed to drive the elevator mechanism of a wagon loader in the event the transmission is employed in connection with such. The sprocket 12 is adapted to be locked to the drive shaft 8 by means of a clutch mechanism 14, including a clutch element 15 which is splined to the shaft 8 and is adapted to be moved longitudinally thereupon by means of a crank arm 16 carried by a control shaft 17 which projects through the transmission housing 7 and carries at its outer end an arm 18, pivotally connected to a link 19 which in turn is connected to a hand operated lever 20, suitably supported by the frame 6.

The shaft 8 carries a sprocket 21 which is connected, by means of a sprocket chain 22, to a sprocket 23 rotatably mounted upon the shaft 9 and adapted to be locked therewith by means of a clutch mechanism 24, including a clutch element 25. The clutch element 25 is splined to the shaft 9 and adapted to be moved longitudinally thereon by means of an operating shaft 26, one end of which is formed with a crank arm 27, adapted to engage the clutch element 25. The operating rod 26 is suitably journaled within the housing 7 and projects through the wall thereof, the outer end being provided with an arm 28 to which is pivotally connected a link 29, the link 29 being pivotally connected to an operating lever 31, supported by the frame 6.

Upon the shaft 8 is rotatably mounted a gear 32 which meshes with a gear 33 secured to the shaft 9. The gear 32 is adapted to be locked to the shaft 8 by means of a suitable clutch mechanism 34 which includes a clutch element 35, splined to the shaft 8 and adapted to be moved longitudinally thereupon by means of a crank arm 36 carried by the operating shaft 26.

To the shaft 9 is suitably connected a pinion 37, meshing with a spur gear 38 which constitutes an element of a differential mechanism 39, the differential mechanism 39 being associated with a pair of power shafts 41 adapted to be operatively connected through suitable gearing, not shown, to the traction mechanism of a wagon loader.

With the power shafts 41 connected to a traction mechanism, and with the sprocket 10 connected to a suitable source of power, such as an internal combustion engine, not shown, mounted upon a wagon loader and constituting the power unit thereof, the loader in its entirety may be propelled from place to place by moving the lever 31 from its neutral position shown in Figure 5 towards the left, thereby so moving the clutch element 25 as to lock the sprocket 23 to the shaft 9 and thus operatively connecting the shafts 8 and 9 together to effect rotation of the power shafts 41 through the pinion 37 and spur gear 38. In the event it is desired to reverse the movement of the loader the hand lever 31 is moved to the right, as viewed in Figure 5, thereby so moving the clutch element 25 as to release the sprocket 23 and at the same time so moving the clutch element 35 as to lock the spur gear 32 to the drive shaft 8 through the clutch mechanism 34. By arranging the clutch mechanisms 24 and 34, as shown, it is possible to utilize a single shaft, namely, shaft 26, to control the movement of the wagon loader in both forward and backward directions. It will also be noted that since a neutral position is provided for the clutch elements 25 and 35, the sprocket 23 is released from the shaft 9 before the spur gear 32 is locked to the shaft 8 in changing from a forward speed to reverse, and that the spur gear 32 is released from the driving shaft 8 before the sprocket 23 is connected to the driving shaft 9 when changing from a reverse movement to a forward movement of the loader. Since the take-off sprocket 12 is controlled through a clutch mechanism 14 adapted to be operated independently of the clutch mechanisms 24 and 34, it is obvious that the sprocket 12 may be locked to the shaft 8 or unlocked therefrom regardless of whether or not the shafts 8 and 9 are operatively connected together.

In wagon loaders of the type shown in the above mentioned patent, it is desirable to effect a slow or crowding reverse movement of the loader towards and into the pile of material to be loaded, and to accomplish such movement there is provided an auxiliary transmission 42 which is adapted to so connect the shafts 8 and 9 that the latter will be driven in the same direction, but of course at a much reduced speed, as when the shafts 8 and 9 are operatively connected through the gears 32 and 33. This auxiliary transmission 42 comprises a worm 43 suitably journaled within a yoke 44, rotatably mounted upon the shaft 8 to which is secured a bevel gear 45 adapted to mesh with a similar gear 46 carried by the worm 43. The outer or free end of the worm 43 is journaled within a movable bearing 47 which is linked by means of a coupling 48, to a crank arm 49, suitably connected to an operating shaft 51 which projects through the housing 7 and carries at its outer end a hand operated lever 52. The worm 43 is adapted to be moved, by means of the hand operated lever 52, into or out of engagement with a worm gear 53 secured to the shaft 9 and is guided in its movement by means of a pair of spaced parallel guides 54, adapted to cooperate with the free end of the worm 43. In order to effectively lock the worm 43 in driving engagement with the worm gear 53, an adjusting screw 55 carried by the housing 7 may be so adjusted that when the hand operated lever 52 is positioned as shown in Figure 4 the center of the pivotal connection between the coupling 48 and the arm 49 will lie slightly off-center with respect to a plane passed through the axis of the shaft 51 and the center of the pivotal connection afforded between the bearing 47 and the coupling 48. Once the proper adjustment has been made of the adjusting screw 55, such adjustment may be preserved by means of a lock nut 56, which is adapted to be run down upon the adjusting screw and into intimate engagement with the housing 7.

In order to prevent operative connection being established between shafts 8 and 9 through the sprocket chain 22 or the spur gears 32 and 33 when these shafts are operatively connected through the auxiliary transmission 42, and in order to prevent connecting the shafts 8 and 9 through the auxiliary transmission 42 when these shafts are connected through either the sprocket chain 22 or the spur gears 32 and 33, I have provided an interlocking mechanism 57 adapted to cooperate with the levers 31 and 52. This interlocking mechanism comprises a locking bar or element 58 which is pivotally connected to an arm 59 carried by the shaft 51, the free end of the bar 58 being adapted to ride within a suitable guide 61 supported by the frame 6. The interlock mechanism 57 also includes a pair of guard plates 62 and 63 which are secured to the link 29 and spaced from each other a sufficient distance to permit the free end of the bar 58 to enter therebetween.

From the arrangement of the elements entering into the interlocking mechanism 57, it will be appreciated that the only time at which the shafts 8 and 9 can be operatively connected through the auxiliary transmission 42 is when the lever 31 is in its neutral position as shown in Figure 5, since only when the lever 31 is in this position are the plates 62 and 63 so positioned as to permit the bar 58 to enter therebetween. When the lever 31 is in its neutral position the shafts 8 and 9 are not connected through either the sprocket chain 22 or the spur gears 32 and 33, for the reason that the sprocket 23 is free to rotate upon the shaft 9 and the spur gear 32 is free to rotate upon the shaft 8. After the operating lever 52 is moved to its position shown in Figure 4 to operatively connect the shafts 8 and 9 through the auxiliary transmission 42, the plates 62 and 63, between which the free end of the bar 58 has been moved, cooperate with the lever 58 to lock the lever 31 against movement in either direction from its position shown in Figure 5. By reason of the lever 31 having been so locked in its neutral position, it is impossible, so long as the shafts 8 and 9 are connected through the auxiliary transmission 42, to connect these shafts through either the sprocket chain 22 or the spur gears 32 and 33. If it is desired to establish a driving connection between the shafts 8 and 9, through either the sprocket chain 22 or the spur gears 32 and 33, it is necessary to move the lever 52 in the direction of the arrow shown in Figure 4, and thereby move the free end of the bar 58 out of the space afforded between the plates 62 and 63. After so moving the lever 52 as to sever the interlocking connection between the plates 62 and 63 and the bar 58, the lever 31 may be moved to the left from its neutral position, shown in Figure 5, to operatively connect the shafts 8 and 9 through the sprocket chain 22, or the lever 31 may be moved to the right of its neutral position to operatively connect the shafts 8 and 9 through the spur gears 32 and 33. While the lever 31 is so positioned as to maintain an operative connection between the shafts 8 and 9 through the sprocket chain 22, it is impossible to so move the lever 52 as to operatively connect the shafts 8 and 9 through the auxiliary transmission 42, for the reason that the plate 63 is maintained in the path of the bar 58 and cooperates therewith to maintain the lever 52 in its neutral position. On the other hand while the lever 31 is so positioned as to maintain an operative connection between the shafts 8 and 9 through the spur gears 32 and 33, the plate 62 is so positioned in front of the bar 58 as to maintain the lever 52 in its neutral position.

By the arrangement of the elements herein provided, through which the operation of the transmission is controlled, a positive and reliable means is afforded for preventing the shafts 8 and 9 from being operatively connected through the auxiliary transmission 42 so long as an operative connection is afforded between the shafts 8 and 9 through either the sprocket chain 22 or the spur gears 32 and 33. It is likewise apparent that an effective and reliable means is provided for preventing the shafts 8 and 9 from being operatively connected through either the sprocket chain 22 or the spur gears 32 and 33, so long as these shafts are operatively connected through the auxiliary transmission 42. The transmission embodying the invention offers not only the above advantages, but an additional advantage is realized by reason of the fact that the auxiliary transmission is combined with the main transmission in such a way as to offer a more direct transmission of power than it is possible to obtain with the form of auxiliary transmission disclosed in the above mentioned patent. Furthermore, by combining the auxiliary transmission with the main transmission as described herein it is possible to utilize the housing of the main transmission as a housing for the auxiliary transmission whereby the auxiliary transmission is protected from dirt, grit, or other foreign matter which would be extremely objectionable when employed in such a machine as a wagon loader. Not only does the housing herein employed serve to protect the auxiliary transmission from dirt, grit and the like, but it may be utilized as a reservoir for a lubricant whereby the auxiliary transmission may be properly lubricated, under all conditions, in the same manner as the main transmission.

Having thus described the invention what is claimed is:

1. In an interlocking mechanism for a power transmission having driving and driven shafts and main and auxiliary driving means; a lever operatively connected to said main driving means for connecting and disconnecting said shafts; a second lever operatively connected to said auxiliary driving means for connecting and disconnecting said shafts, the second named lever being movable independently of the first named lever; a locking bar connected to one of said levers and adapted to be moved therewith; and a locking plate associated with the other of said levers and adapted to be moved therewith into the path of said locking bar whereby movement of one of said levers is prevented when the other of said levers is moved first.

2. In an interlocking mechanism for a power transmission having driving and driven shafts and main and auxiliary driving means; a lever operatively connected to said main driving means for connecting and disconnecting said shafts; a second lever operatively connected to said auxiliary driving means for connecting and disconnecting said shafts, the second named lever being movable independently of the first named lever; a locking bar connected to one of said levers and adapted to be moved therewith; and a pair of locking plates spaced from each other and associated with the other of said levers and adapted to be moved therewith, one into the path of said locking bar when said other lever is moved in one direction and the other into the path of said locking bar when said other lever is moved in an opposite direction whereby movement of one of said levers is prevented when the other of said levers is moved first.

3. In an interlocking mechanism for a power transmission having driving and driven shafts and main and auxiliary driving means; a lever operatively connected to said auxiliary driving means for connecting and disconnecting said shafts; a locking bar pivotally connected to said lever and adapted to be moved therewith; a link operatively connected to said main driving means; a lever connected to said link for connecting and disconnecting said shafts through said main driving means; and a pair of spaced locking plates connected to said link and adapted to be moved therewith, one into the path of said locking bar when the first mentioned lever is moved in one direction, and the other into the path of said locking bar when the first mentioned lever is moved in an opposite direction, whereby movement of the second named lever is prevented when the first named lever is moved first.

In testimony whereof, I have affixed my signature to this specification.

ALFRED W. HAISS.